US008630204B1

(12) United States Patent
Williams et al.

(10) Patent No.: US 8,630,204 B1
(45) Date of Patent: Jan. 14, 2014

(54) SYSTEM AND METHOD FOR A TCP MAPPER (71) Applicant: LiveQos Inc., Ottawa (CA)

(72) Inventors: Matthew Robert Williams, Kanata (CA); Mohan Krishna Vemulapali, Nepean (CA); Uri Nebogatov, Kanata (CA); Miika Anttoni Klemetti, Kanata (CA); Vijayendran Mahendran, Kanata (CA)

(73) Assignee: LiveQoS Inc., Ottawa, ON (CA)

( * ) Notice: Subject to any disclaimer, the term of this patent is extended or adjusted under 35 U.S.C. 154(b) by 0 days.

(21) Appl. No.: 13/644,057

(22) Filed: Oct. 3, 2012

(51) Int. Cl.
*H04L 1/00* (2006.01)

(52) U.S. Cl.
USPC .......................................................... 370/253

(58) Field of Classification Search
None
See application file for complete search history.

(56) References Cited

U.S. PATENT DOCUMENTS

| | | | | |
|---|---|---|---|---|
| 6,208,653 B1 * | 3/2001 | Ogawa et al. | ............ | 370/395.52 |
| 6,826,147 B1 * | 11/2004 | Nandy et al. | .................. | 370/229 |
| 8,351,327 B1 * | 1/2013 | Binns | ............................ | 370/229 |
| 2003/0231636 A1 | 12/2003 | Berzosa et al. | | |
| 2008/0062879 A1 * | 3/2008 | Sivakumar et al. | ........... | 370/235 |
| 2011/0211449 A1 * | 9/2011 | Attar et al. | .................... | 370/235 |
| 2012/0213069 A1 * | 8/2012 | Oguchi | ......................... | 370/231 |
| 2013/0114408 A1 | 5/2013 | Sastry et al. | | |

OTHER PUBLICATIONS

"Identifying TCP Congestion Control Mechanisms using Active Probing" by S. S. Feyzabadi located at http://ends.eecs.jacobs-university.de/courses/nds-2009/feyzabadi-report.pdf, (8 pages).
"TCP Hybla: a TCP Enhancement for Heterogeneous Networks," by C. Caini et al, in International Journal of Satellite Communications and Networking, John Wiley & Sons, vol. 22 , No. 5, pp. 547-566, dated Sep. 2004 (20 pages).
"CUBIC: A New TCP-Friendly High-Speed TCP Variant" by Ha et al., ACM SIGOPS Operating System Review, vol. 42, Issue 5, Jul. 2008, pp. 64-74, 2008 (11 pages).
"DCTCP: Efficient Packet Transport for the Commoditized Data Center" by Alizadeh et al., Proceedings of SIGCOMM 2010 (15 pages).
"TCP Westwood: Bandwidth Estimation for Enhanced Transport over Wireless Links" by Mascolo et al., Proc. of the ACM Mobicom 2001, Rome, Italy, Jul. 16-21, 2001 (11 pages).
"Performance evaluation and comparison of Westwood+, New Reno and Vegas TCP Congestion Control" by Grieco et al., ACM Computer Communication Review, Apr. 2004, vol. 34(2) (14 pages).
"FAST TCP: Motivation, Architecture, Algorithms, Performance" by Wei et al., IEEE/AM Transactions on Networking, vol. 14. No. 6, dated Dec. 2006 (14 pages).
"TCP-Illinois: A loss and delay-based congestion control algorithm for high-speed networks" by Liu et al., pp. 417-440, Performance Evaluation 65, 2008 (13 pages).

* cited by examiner

*Primary Examiner* — Yong Zhou
(74) *Attorney, Agent, or Firm* — Nixon Peabody LLP (57) ABSTRACT

A system is provided for congestion control of traffic in a network that uses Transmission Control Protocol (TCP). The system includes at least one TCP congestion control program, at least one TCP congestion control unit running one of the TCP congestion control programs, and a TCP mapper adapted to map incoming TCP traffic to one of the TCP congestion control units, based on at least one of (a) the type of application program from which the incoming TCP traffic flow originated, (b) the type of network for which the incoming TCP traffic flow is destined, (c) parameters related to network performance, (d) network constraints, (e) source of the incoming TCP traffic flow, and (f) destination of the incoming TCP traffic flow.

20 Claims, 6 Drawing Sheets

SYSTEM AND METHOD FOR A TCP MAPPER

FIELD OF THE INVENTION

This invention is directed towards networks that use the Transmission Control Protocol (TCP).

BACKGROUND OF THE INVENTION

Figure 1:
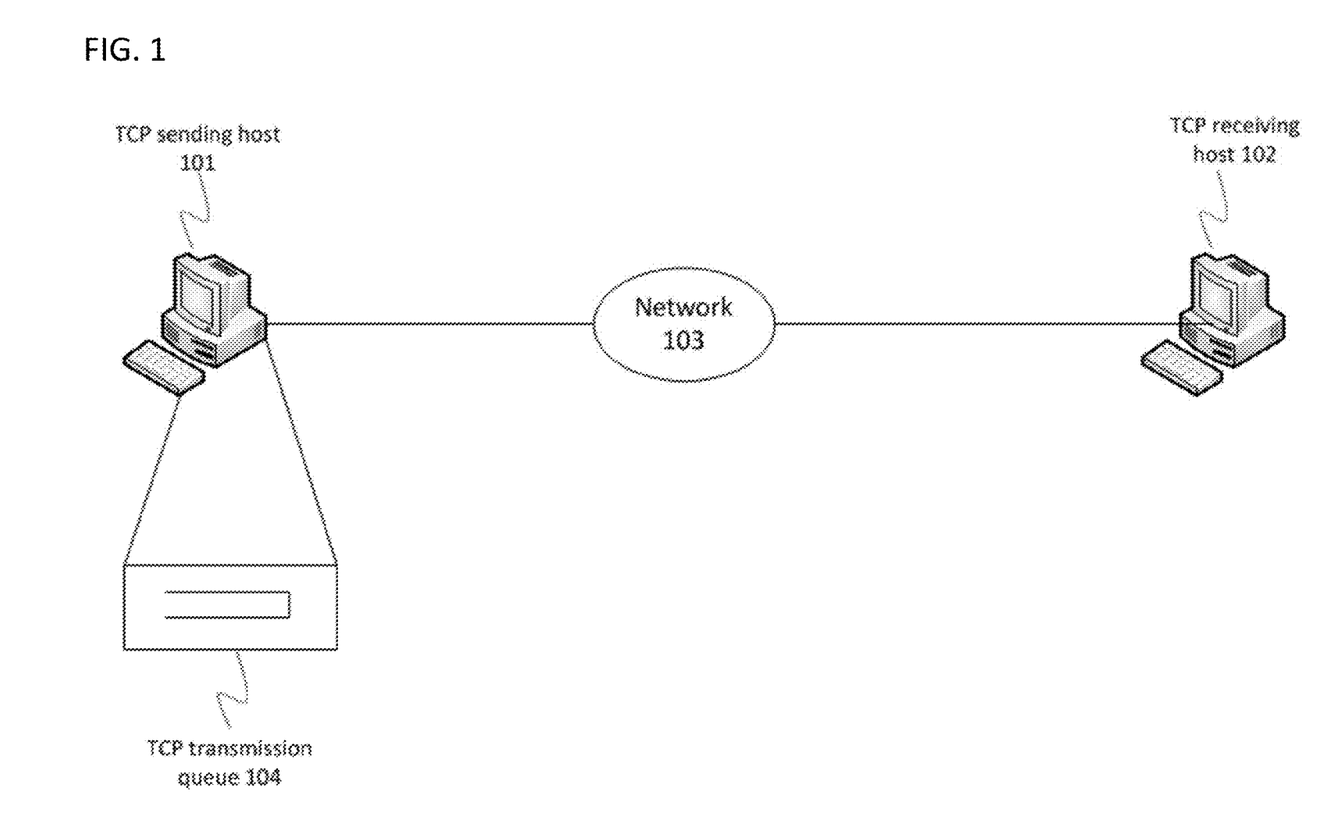
FIG. 1 shows a typical network with one TCP sending host and one TCP receiving host.

FIG. 1 shows a typical network, with a TCP sending host 101 sending traffic using TCP over a network 103 to a TCP receiving host 102. The TCP sending host 101 has a TCP transmission queue 104. Network 103 could be, for example a single wired, 3 G, 4 G or Wi-Fi network. In one embodiment, network 103 could further contain wired, 3 G, 4 G or Wi-Fi subnetworks. In a system, such as that of FIG. 1, there are 3 dominant sources of delay:

1. The propagation delay of the network 103
2. The delay due to buffering within the network 103
3. The delay due to buffering in the TCP transmission queue 104 at the sending host 101

Then $D_T = D_1 + D_2 + D_3$ where $D_T$ is the total delay $D_1$ is the delay due to source (1)

$D_2$ is the delay due to source (2)

$D_3$ is the delay due to source (3)

In many cases total delay tends to be dominated by $D_3$.

It is also known that TCP has different stages and that maximum throughput is reached after progression through one or more other stages. This progression can take place over several multiples of Round Trip Time (RTT). This has the effect of reducing the average throughput of traffic over the link from the host.

Furthermore, different types of traffic have different requirements. For example, traffic such as file transfers requires large amounts of bandwidth. Remote Desktop Protocol (RDP) traffic is more latency sensitive. Traffic such as email only requires reliable delivery. Having one TCP congestion control program at the sending host 101 does not allow for optimization of different types of traffic.

In addition, different network types have different requirements. For example, a wired network has different requirements from a 3 G, 4 G or Wi-Fi network. Having one TCP congestion control program at the sending host 101 does not allow for optimization of different types of networks.

SUMMARY OF THE INVENTION

In accordance with one embodiment, a system is provided for congestion control of traffic in a network that uses Transmission Control Protocol (TCP). The system includes at least one TCP congestion control program, at least one TCP congestion control unit running one of the TCP congestion control programs, and a TCP mapper adapted to map incoming TCP traffic to one of the TCP congestion control units, based on at least one of (a) an application program from which the incoming TCP traffic originated, (b) the type of network for which the traffic is destined, (c) parameters related to network performance, (d) network constraints, (e) source of the incoming TCP traffic flow, and (f) destination of the incoming TCP traffic flow. At least one parameter of each TCP congestion control program run by a TCP congestion control unit, is tuned. The tuning may be based on (a) parameters related to network performance, and (b) network constraints.

In one implementation, the mapping is based (a) the type of application program from which the incoming TCP traffic flow originated, (b) the type of network for which the incoming TCP traffic flow is destined, (c) parameters related to network performance, (d) network constraints, (e) source of the incoming TCP traffic flow, and (f) destination of the incoming TCP traffic flow.

Each of said TCP congestion control units may have an associated buffer, with the TCP mapper storing the mapped incoming TCP traffic in the buffer associated with the TCP congestion control unit to which the incoming TCP traffic is mapped.

The TCP mapper is preferably located close to a TCP sending host that transmits the incoming TCP traffic, so as to reduce the round trip time seen by the sending host.

When the incoming traffic may comprise RDP traffic, at least one of the TCP congestion control units controls congestion for RDP traffic, and the RDP traffic is mapped to the a TCP congestion control unit that controls congestion for RDP traffic.

BRIEF DESCRIPTION OF THE DRAWINGS

The invention may best be understood by reference to the following description taken in conjunction with the accompanying drawings.

DETAILED DESCRIPTION OF ILLUSTRATED EMBODIMENTS

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Figure 2:
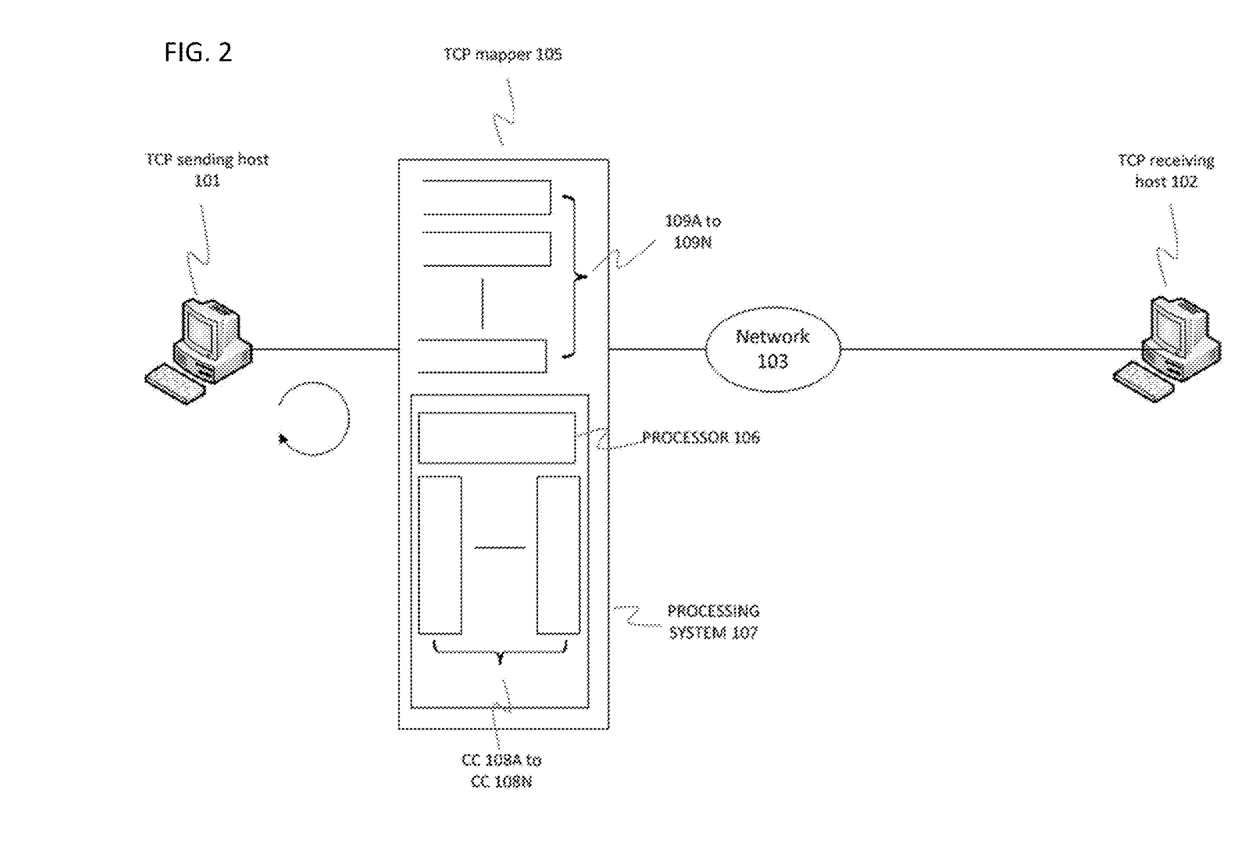
FIG. 2 shows the network of FIG. 1, but with a TCP mapper included.

FIG. 2 shows the network of FIG. 1, but with a TCP mapper 105 included. The TCP mapper 105 acts as a midstream TCP proxy for TCP streams that would normally terminate on the TCP receiving host. The TCP mapper 105 contains a processing system 107. TCP mapper 105 intercepts incoming TCP traffic flows from the TCP sending host 101, and the processor 106 within a TCP mapper processing system 107 maps the incoming TCP traffic flow to one of the TCP congestion control (CC) units 108-A to 108-N in the TCP mapper processing system 107. In one embodiment, each CC unit runs a different congestion control program. In another embodiment, a subset of the CC units may run the same program, but each CC unit within that subset can only tune or configure a given subset of parameters used within the program. In another embodiment, the TCP mapper processor 106 works together with each CC unit to tune the parameters available to the CC unit for the corresponding TCP congestion control program run by the CC unit. Examples of CC programs are provided below. Each CC unit also has an associated buffer, 109-A to 109-N as shown in FIG. 2, used to store packets awaiting transmission. In one embodiment, the TCP mapper 105 has several sensors (not shown) to, for example, measure parameters relating to network performance, such as loss, throughput, latency, bandwidth, jitter and goodput. In another embodiment, the TCP mapper further uses these parameters to perform analyses. As will be further detailed below, in another embodiment the TCP mapper performs mapping based on whether network constraints, for example prioritization and traffic policing, are being applied in the network.

The TCP mapper 105 provides several advantages. As has been explained previously, the sending host 101 has to progress through one or more different stages before reaching the stage corresponding to maximum throughput. Additionally, the speed of progression through the stages depends on the round trip time (RTT). In one embodiment, the mapper 105 is separate but closely located to the sending host 101. In one embodiment, the RTT between the mapper 105 and sending host 101 is below a threshold RTT $RTT_{thresh}$, which is a fraction of the RTT between the sending host 101 and the receiving host 102. $RTT_{thresh}$ can be set, for example, via analysis of historical records, calculation, or simulation of network performance. Since the mapper 105 is positioned close to the sending host 101, interception by the mapper 105 has the effect of reducing the RTT seen by the sending host 101, and therefore speeding up the throughput progression of the TCP sending host 101 through the various stages before reaching the stage corresponding to maximum throughput.

In another embodiment, the TCP mapper is placed within the sending host 101, but separate from the sending host 101 TCP engine. This has the effect of reducing the RTT to nearly zero and further speeding up the progression of the sending host through the TCP stages to reach the stage where maximum throughput can be achieved. In yet another embodiment, the TCP mapper replaces the sending host 101 TCP engine.

The TCP mapper 105 can recognize the application from which the traffic originates, such as, for example, including but not limited to, file transfer traffic, Remote Desktop Protocol (RDP) traffic, or streaming traffic. In one embodiment, the TCP mapper recognizes the originating application by inspecting packet headers and contents. In another embodiment, the TCP mapper recognizes the originating application through explicit notification by an application, end system or other network device.

In one embodiment, the TCP mapper 105 maps traffic to corresponding congestion control units, based on the originating application, and stores the packets from the different applications in one of the buffers 109A to 109N corresponding to the chosen congestion control unit.

In another embodiment, the TCP mapper is able to determine the type of network that the traffic is destined for, by, for example, inspecting packet headers or contents to determine destination, and recognizing the type of network, for example, wired, 3 G, 4 G or Wi-Fi that it is destined for. Then, the TCP mapper maps traffic to CC units 108A to 108N based on the type of network that the traffic is destined for. For example, there could be different CC units corresponding to wired, 3 G, 4 G or Wi-Fi networks.

In another embodiment, the TCP mapper is aware of the congestion control program used by other TCP flows flowing through a common network device. Then the mapping to CC units 108A to 108N is dependent upon the congestion control program used by these other flows. For example, if the TCP mapper needs to map traffic from an incoming flow, and determines that many of the other incoming flows are sent by hosts using the TCP Reno program, then the TCP mapper may map the traffic from the incoming flow to the TCP CUBIC program.

The TCP mapper can determine the other congestion control programs being used in the network in a variety of ways. In one embodiment, the TCP mapper can correlate congestion window size evolution of an unknown congestion control program to that of an existing congestion control program, based on the known behaviour of the congestion control program.

In another embodiment, the TCP mapper samples the evolution of the inflight window, which is the amount of bytes in flight for a given RTT; and detects that this value is linearly increasing with time, assuming discrete RTT-sized time increments. Based on this, the TCP mapper decides with reasonable accuracy that the TCP RENO congestion control program is being used.

In another embodiment, the TCP mapper uses higher sampling rates, to sample the evolution of the inflight window, and determines that the shape of the curve between loss events is that of a cubic function, biased in time and amplitude. Based on this, the TCP mapper decides with reasonable accuracy that the TCP CUBIC congestion control program is being used.

In another embodiment, the TCP mapper uses known methods for identifying congestion control programs based on probing methods (see e.g. "Identifying TCP Congestion Control Mechanisms using Active Probing" by S. S. Feyzabadi located at http://ends.eecs.jacobs-university.de/courses/nds-2009/feyzabadi-report.pdf).

In another embodiment, after deducing the TCP congestion control program being used by a host, the TCP mapper further determines whether it is suitable for flows originating from that host given current observed network conditions. If not, the TCP mapper maps such flows to a more appropriate congestion control program.

In another embodiment, the TCP mapper maps traffic to CC units 108A to 108N based upon either the source or the destination of the flow to which the traffic belongs. The TCP mapper is able to identify the source or the destination by, for example, inspecting packet headers and contents; or via explicit notification by an application, end system or other network device.

In yet another embodiment, the TCP mapper maps traffic to CC units 108A to 108N based upon measurements of parameters relating to network performance such as loss, throughput, goodput, latency, packet jitter and bandwidth. In one embodiment, these parameter measurements are taken by sensors within the TCP mapper 105. However, certain parameters may only be measured at the receive side, so in another embodiment, these network performance are measured externally, for example, by external sensors at the receive side, and conveyed to the TCP mapper 105 via either in-band or out-of-band techniques.

In another embodiment, the TCP mapper uses these measurements to perform analyses, and makes mapping decisions based on the results of these analyses. For example, the TCP mapper could use these measurements to determine if a network is congested, and the nature of the congestion, in the following way: When the aggregate bitrate of all the flows in a given channel reaches the limits of the channel capacity, the channel is said to be congested. The persistence of this congestion can be determined by analyzing the resulting steady-state and mapping out the evolution of loss and latency over time; as well as the correlation between the two. Then, based on the results of these analyses, the TCP mapper maps traffic to one of the CC units.

In yet another embodiment, the TCP mapper maps traffic to CC units 108A to 108N based upon network constraints such as prioritization of certain types of traffic over other types of traffic with the network; and the presence of traffic policing. In one embodiment, the TCP mapper can auto-detect the presence of such constraints. For example, the TCP mapper is able to detect if prioritization is being used by looking at various aspects of the packets such as Internet Protocol Differentiated Services Code Point (IP DSCP) bits or looking at the priority bits in the Media Access Control (MAC) headers. The TCP mapper is also able to detect when a given TCP stream is "application-limited," or in other words, not utilizing the maximum bandwidth allowed by the current state of the CC program. By analyzing if the flow in question is "application limited" or is being limited by prioritization policies, the TCP mapper can choose an appropriate CC program. Alternatively, the TCP mapper can be explicitly programmed to take into account these network constraints. For example, the mapper may be programmed by a user to recognize that certain types of traffic will be prioritized over other types of traffic. Similarly, relevant data can be extracted from policing contracts by a user and then explicitly programmed into the TCP mapper by a user. Mapping decisions are then made based on this data.

In a further embodiment, the TCP mapper maps traffic to CC units 108A to 108N based upon two or more of
  originating application;
  the type of network that the traffic is destined for;
  source of the flow to which the traffic belongs;
  destination of the flow to which the traffic belongs;
  parameters related to network performance
  network constraints As explained previously, in one embodiment, each CC unit runs a different congestion control program. In another embodiment, a subset of the CC units may run the same program, but each CC unit within that subset can only tune or configure a given subset of parameters used within the program. In another embodiment, the TCP mapper processor 106 works together with each CC unit to tune the parameters available to the CC unit for the corresponding TCP congestion control program run by the CC unit.

The mapping can be carried out in a variety of ways. In one embodiment, a lookup table can be used to map TCP port numbers to CC units with a defined default CC unit being used in the case that no lookup table entry exists. Other lookup tables could map source and destination IP addresses and other IP and TCP header values to target CC units. In another embodiment, multiple lookup tables can be used in order until a match is found.

As explained previously, each congestion control unit is able to tune the parameters available to the CC unit for the congestion control program which is run by the CC unit on the fly, such that the constraints for each flow type (latency, bandwidth, jitter) are met. As an example, if the CC unit is using the TCP CUBIC, the reference time constants and overall scaling factors can be the adjusted parameters. Multiple tuning approaches can be used. In one embodiment, tuning can be based on measurements of parameters relating to network performance such as loss, throughput, goodput, latency, packet jitter and bandwidth. A lookup table containing measured network performance-related metrics and tuning parameters can be used. These metrics can include packet loss, latency, jitter, throughput, goodput and other measurable network statistics. In another embodiment, a lookup table relating internal CC metrics such as buffer fill level and timer values to tuning parameters can be used. In another embodiment, the TCP mapper processor 106 co-operates with each CC unit to tune the parameters available to the CC unit for the corresponding TCP congestion control program run by the CC unit, such as in the TCP CUBIC example given above. Initial parameter values can be calculated based on historical measurements and then further tuned as new measurements are made.

In another embodiment, the TCP mapper uses these measurements to perform analyses, and performs tuning based on the results of the analyses. As previously explained, the TCP mapper may, for example, use these measurements to determine if the network is persistently congested. The TCP mapper can then perform tuning accordingly.

In another embodiment, tuning can be based upon network constraints, for example, prioritization of certain types of traffic over other types of traffic within the network. As explained previously, the TCP mapper is able to auto-detect if constraints such as prioritization are being used. Alternatively, the TCP mapper can be explicitly programmed by a user to take constraints into account when performing mapping. As previously explained, the mapper can be programmed to take into account the prioritization of certain types of traffic will be prioritized over other types of traffic. Similarly, relevant data can be extracted from policing contracts by a user and then explicitly programmed into the TCP mapper by the user. Tuning decisions are then made based on this data.

In another embodiment, as previously explained, the TCP mapper is aware of the congestion control programs used by other TCP flows flowing through a common network device. The mapper is able to identify congestion control programs using various approaches, as outlined above. Then, the mapper can perform tuning based on the other congestion control programs being used in the network.

In another embodiment, the mapping to a CC unit for a given flow could be switched "on the fly" by the TCP mapper 105 based on network performance measurements. Consider a situation where a flow is currently mapped to a first CC unit. The mapping can then be dynamically switched, such that congestion control for traffic belonging to the same flow will then be handled by a second CC unit, different from the first CC unit. After the dynamic switching, the traffic belonging to the flow will be buffered in the buffer corresponding to the second CC unit. This can be accomplished by copying the data from the buffer of the first CC unit to the buffer of the second CC unit and using the latest known metrics to calculate the initial settings for the parameters available to the second CC unit. In one embodiment, the TCP mapper processor 106 dynamically switches the flow mapping to the second CC unit and copies the traffic belonging to the flow from the first CC unit to the buffer of the second CC unit. The second CC unit calculates the initial settings for the parameters available to it. In a further embodiment, the TCP mapper processor 106 co-operates with the second CC unit to calculate the initial settings for the parameters.

Another approach is for the TCP mapper processor 106 to co-operate with the first CC unit to tune the parameters available to the first CC unit for the CC program being run by the first CC unit; while the TCP mapper processor 106 concurrently co-operates with alternate CC units to tune available parameters for the CC programs run by the alternate CC units. This way, the correct settings for the parameters are already in place when a switch to an alternate CC unit is desired.

Congestion control program parameter tuning is performed based on, for example, network performance measurements such as loss, throughput, goodput, latency, packet jitter and bandwidth. As explained previously, in one embodiment, these network performance measurements are taken by sensors within the TCP mapper 105. As explained previously, certain network performance measurements may only be measured at the receive side, so in another embodiment, these network performance measurements are measured externally, for example, by external sensors at the receive side, and conveyed to the TCP mapper 105 via either in-band or out-of-band techniques.

In one embodiment, the TCP mapper processor 106 collects the results from the sensors, and distributes these results to the individual CC units 108A to 108N. At each CC unit, parameters for the TCP congestion control program run by the unit are tuned on the fly by the CC unit based on different application requirements and parameters related to network performance. In another embodiment, the TCP mapper processor 106 works together with each CC unit to tune the parameters for the corresponding TCP congestion control program run by the CC unit.

Various types of TCP congestion control programs can be run. In one embodiment, one of the CC units 108A to 108N runs the TCP Hybla CC program. Then, traffic to be transmitted to networks with long RTTs for example, much greater than 500 ms, is directed to the buffer associated with the TCP Hybla CC unit, and the corresponding TCP Hybla CC unit will be used for congestion control for this traffic. The operation and tuning of relevant parameters in the TCP Hybla CC unit has been well documented elsewhere (see, for example, C. Caini et al, "TCP Hybla: a TCP Enhancement for Heterogeneous Networks," in International Journal of Satellite Communications and Networking, John Wiley & Sons, Volume 22, Number 5, pp 547-566, September 2004)

In another embodiment, one of the CC units 108A to 108N runs the TCP CUBIC congestion control program. Then, for example, traffic to be transmitted to a high speed network, is directed to the buffer associated with TCP CUBIC, and the corresponding TCP CUBIC CC unit will be used for congestion control for this traffic. The operation and tuning of relevant parameters in the TCP CUBIC CC unit has been well documented elsewhere (see, for example, Ha et al "CUBIC: A New TCP-Friendly High-Speed TCP Variant" ACM SIGOPS Operating System Review, Volume 42, Issue 5, July 2008, Page(s):64-74, 2008.)

In another embodiment, one of the CC units 108A to 108N runs the Data Center TCP (DCTCP) congestion control program. Then, for example, traffic to be transmitted to a data center network; or traffic from applications requiring low latency and high bandwidth; is directed to the buffer associated with DCTCP. The corresponding DCTCP CC unit will be used for this traffic. The operation and tuning of relevant parameters in the DCTCP CC unit has been well documented elsewhere (see, for example, Alizadeh et al "DCTCP: Efficient Packet Transport for the Commoditized Data Center", Proceedings of SIGCOMM 2010)

In another embodiment, one of the CC units 108A to 108N runs the TCP Westwood+ congestion control program or the TCP Westwood CC program. Then, for example, traffic to be transmitted to a wireless network is directed to the buffer associated with TCP Westwood+ or TCP Westwood. The corresponding TCP Westwood+ CC unit will then be used for congestion control for this traffic. The operation and tuning of relevant parameters has been well documented elsewhere (see, for example, Mascolo et al "TCP Westwood: Bandwidth Estimation for Enhanced Transport over Wireless Links" Proc. of the ACM Mobicom 2001, Rome, Italy, July 16-21 2001; or Grieco et al "Performance evaluation and comparison of Westwood+, New Reno and Vegas TCP congestion control" ACM Computer Communication Review, April 2004, Vol. 34(2))

In another embodiment, one of the CC units 108A to 108N runs the TCP Illinois congestion control program or the TCP Illinois CC program. Then, for example, traffic to be transmitted to a high speed, long RTT network is directed to the buffer associated with TCP Illinois. The corresponding TCP Illinois CC unit will then be used for congestion control for this traffic. The operation and tuning of relevant parameters has been well documented elsewhere (see, for example, Liu et al, "TCP-Illinois: A loss and delay-based congestion control algorithm for high-speed networks" Pages 417-440, Performance Evaluation 65 (2008))

In another embodiment, one of the CC units 108A to 108N runs the FAST TCP CC program. Then, for example, traffic from applications which are latency and jitter sensitive; or to be transmitted to a high-speed, long RTT network; is directed to the buffer associated with FAST TCP. The corresponding FAST TCP CC unit will then be used for congestion control for this traffic. The operation and tuning of relevant parameters has been well documented elsewhere (see, for example, Wei et al "FAST TCP: Motivation, Architecture, Algorithms, Performance", IEEE/ACM Transactions on Networking, vol. 14. no. 6 Dec. 2006)

Other types of CC programs can be run on the CC units. For example, a CC program which dynamically modifies window sizes based on measured latency can also be run on one of the CC units 108A to 108N. Then, for example, traffic from applications such as Remote Desktop Protocol (RDP) can be directed to the corresponding buffer, and the CC unit will be used for congestion control for this type of traffic.

In one embodiment, the TCP mapper 105 can also perform flow adaptation by sending signals to the sending host so as to, for example:
  control the throughput progression
  avoid the overflow of the buffers in the mapper
  reduce latency due to buffering.
  explicit request to change congestion control program
These steps can include, but are not limited to, one or more of the following:
  reducing the sending rate of traffic by altering timestamps,
  simulating discard of TCP segments,
  modifying window sizes,
  modifying scaling parameters, and
  slowing the transmission of ACKs.

Figure 3:
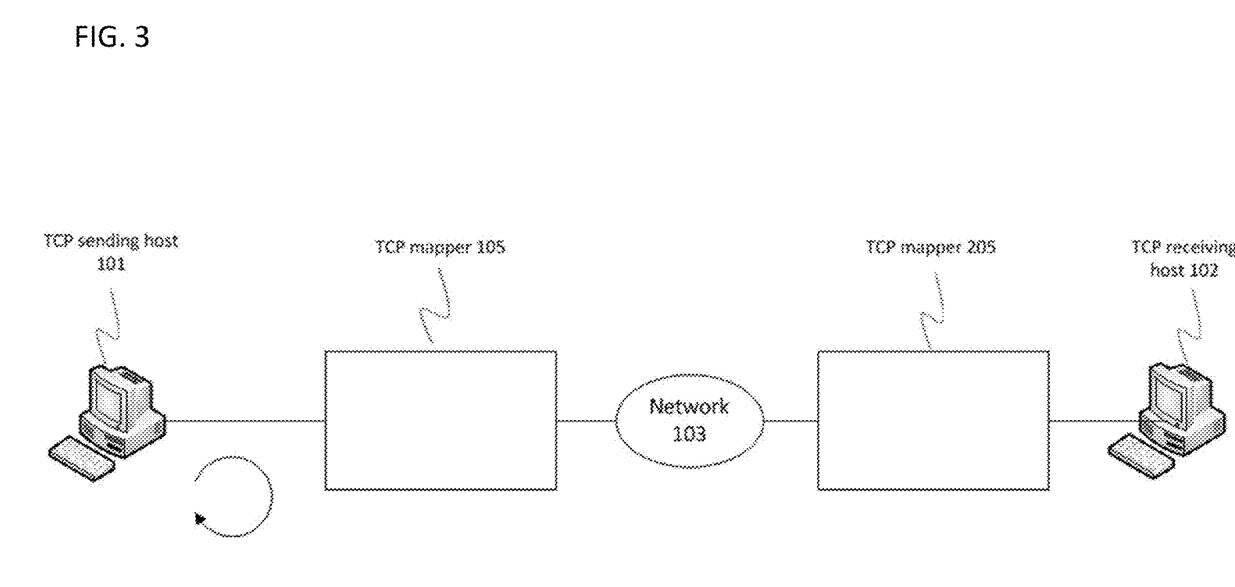
FIG. 3 shows the network 103 with TCP mappers 105 and 205 at the sending and receiving side of the network.

In one embodiment, as shown in FIG. 3, there are TCP mappers 105 and 205 at the sending and receiving side of the network 103 respectively. Then, the sending and receiving mappers 105 and 205 can interact with each other to ensure that the constraints for the various flow types are met. In one embodiment, the receive side TCP mapper 205 can perform the flow adaptation steps outlined above. In another embodiment, both the send side and receive side TCP mappers 105 and 205 perform the flow adaptation steps outlined above. In yet another embodiment, only either the send side TCP mapper 105 or the receive side TCP mapper 205 performs the flow adaptation steps outlined above.

As explained previously certain network performance measurements, including, but not limited to, for example, packet jitter and bandwidth, may only be measured at the receive side. In one embodiment, the sensors in the receive side TCP mapper 205 are used to measure these parameters. Then, the receive side TCP mapper 205 communicates with the send-side mapper 105 using either in-band or out of band techniques. Network performance measurements which could be measured by the receive side TCP mapper 205 include, but are not limited to, received bandwidth of the associated stream, total bandwidth being received (sum of all received streams), packet jitter, bit error rate, packet error rate and inter-packet spacing. Other useful information which could be useful to tune the send-side TCP mapper 105 can be exchanged.

Other information can be exchanged using in-band or out of band techniques. For example, information on type of subnetworks found in network 103, for example WiFi, 3 G and wired; downstream network failures; queueing delays and so on, can be transmitted.

In one embodiment, the TCP mapper 105 at the sending side has 2 modes of operation:

"Single-ended"—where there is no corresponding TCP mapper 205 at the receive side "Dual-ended" where there is a corresponding TCP mapper 205 at the receive side In one embodiment, the send side TCP mapper in dual-ended mode is further configured to summarize one or more TCP acknowledgements into a single TCP acknowledgement. This is beneficial in networks where sending multiple acknowledgements could reduce network performance. In another embodiment, the receive side TCP mapper is able to take in a single TCP acknowledgement, derive one or more TCP acknowledgements from the single TCP acknowledgement, and transmit the one or more derived TCP acknowledgements from the single TCP acknowledgement. In one embodiment, both the summarization and derivation are carried out within one of the TCP congestion control programs.

Figure 4:
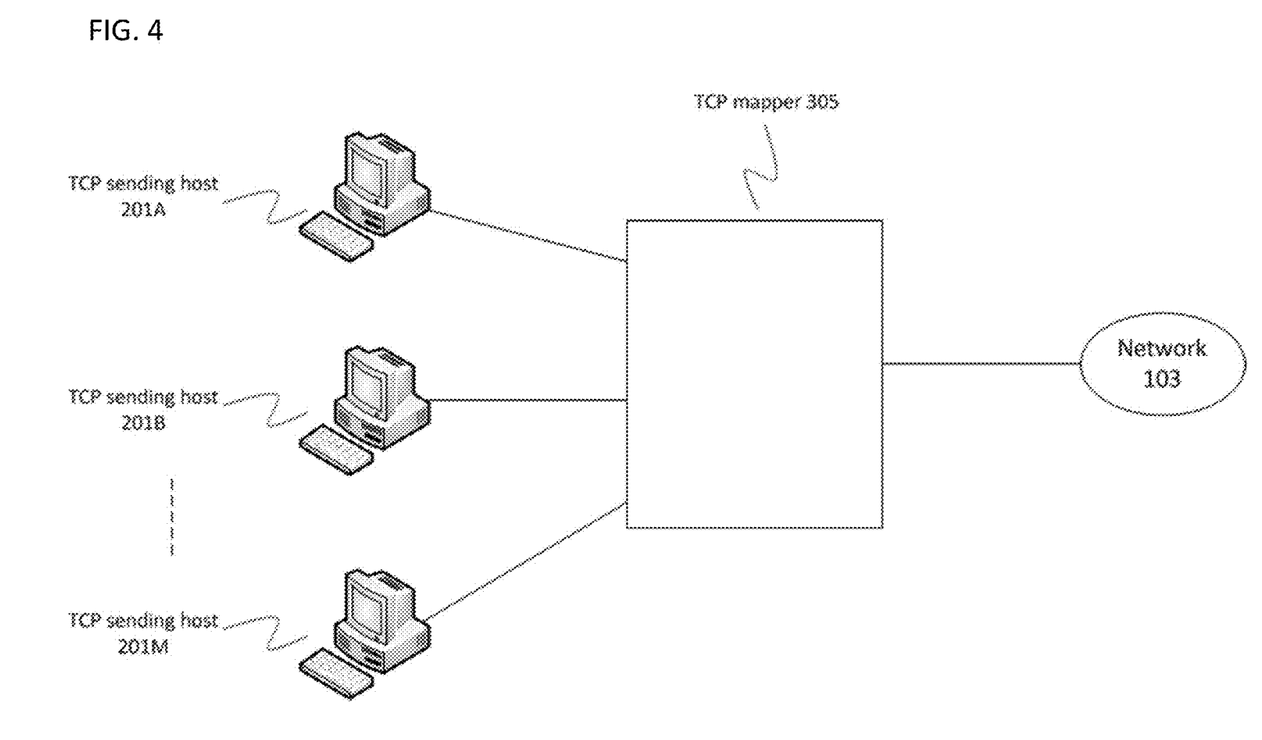
FIG. 4 shows another embodiment, whereby sending TCP hosts 201A to 201M are connected to one mapper.

FIG. 4 shows another embodiment, whereby sending TCP hosts 201A to 201M are connected to the same mapper 305. In this case, the mapper 305 aggregates and processes flows from several different hosts. This could correspond to, for example, an office.

Figure 5:
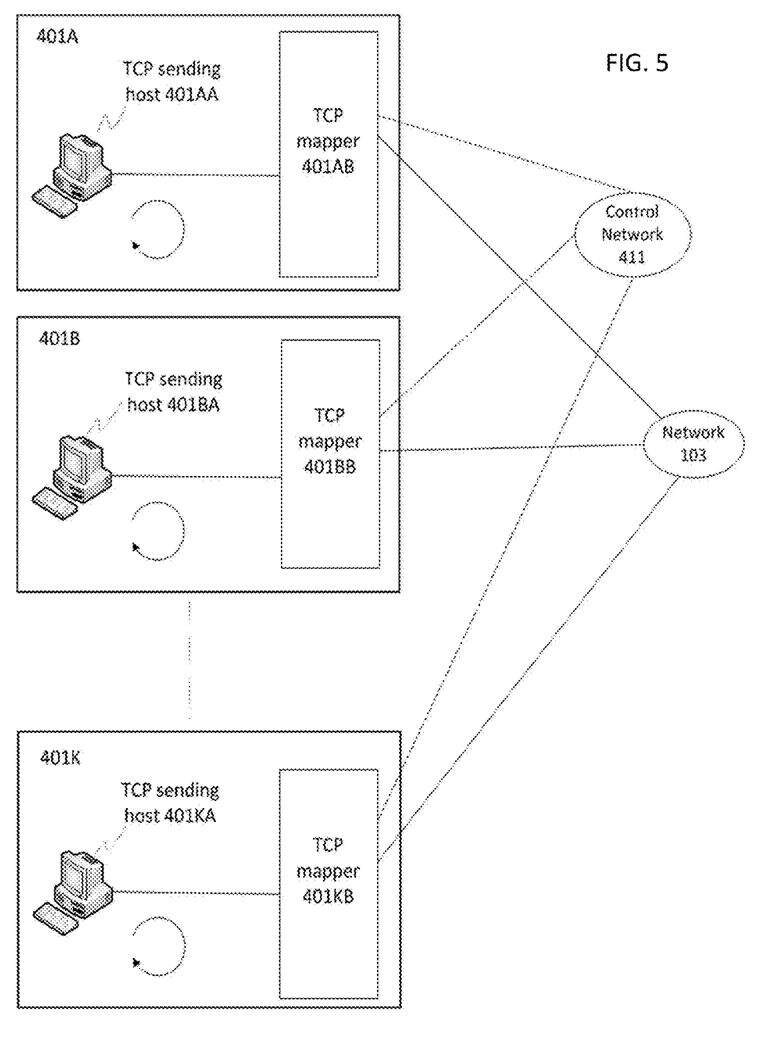
FIG. 5 shows an embodiment, whereby sending host-mapper combinations 401A to 401K are connected to network 103.

FIG. 5 shows yet another embodiment, whereby there are several sending host-mapper combinations 401A to 401K. Host-mapper combination 401A contains TCP sending host 401AA and mapper 401AB; host-mapper combination 401B contains TCP sending host 401BA and mapper 401BB; and so on until host mapper combination 401K, which contains TCP sending host 401KA and mapper 401KB. The mappers 401AA-401KA are connected to control network 411 and can interact with each other. In one embodiment, the mappers 401AA-401KA interact with each other in a decentralized manner. In another embodiment, there is centralized control, for example, one of the mappers 401AA-401KA is considered a master mapper. In another embodiment, the processor in the master mapper additionally plays the role of co-ordinating the operation of the other mappers. In another embodiment, centralized control is provided by a dedicated system, separate from the TCP mappers. In one embodiment, this dedicated system could reside within control network 411. In another embodiment, this dedicated system could be outside of control network 411.

Figure 6:
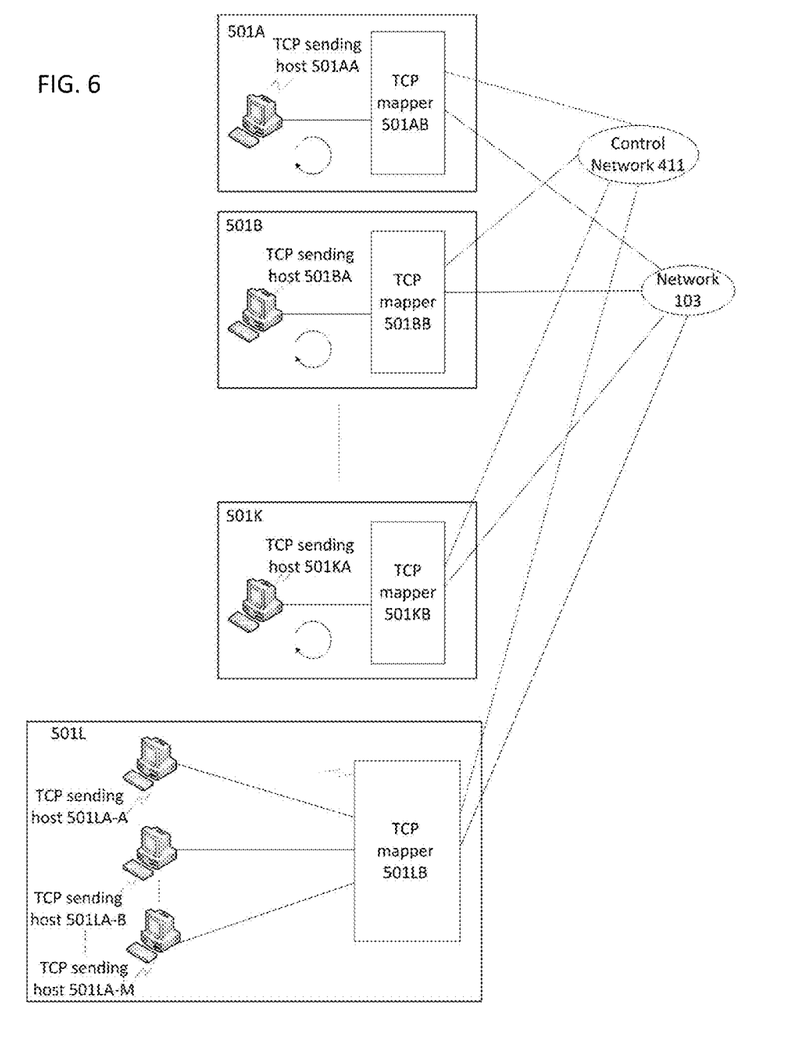
FIG. 6 shows an example with sending-host mapper combinations 501A to 501L wherein combinations 501A to 501K are single sending host-mapper combinations; and combination 501L is a multiple sending host-mapper combination.

Further combinations are also possible. One "hybrid" example is shown in FIG. 6, where there are several sending-host mapper combinations 501A, 501B . . . 501K, 501L. The sending host-mapper combinations 501A to 501K each contain a TCP sending host and a mapper. Host-mapper combination 501A contains TCP sending host 501AA and mapper 501AB; host-mapper combination 501B contains TCP sending host 501BA and mapper 501BB; and so on until host mapper combination 501K, which contains TCP sending host 501KA and mapper 501KB.

However, host-mapper combination 501L is a multiple sending host-single mapper combination, similar to that of FIG. 4. Mapper 501LB is connected to sending hosts 501LA-A to 501LA-M. While only one multiple sending host-single mapper combination is shown, in other embodiments there are more than one multiple sending host-single mapper combinations present.

The configurations shown in FIGS. 4, 5 and 6 can also be implemented on the receiving side. Similar to that of FIG. 4, a single TCP mapper can be connected to several receiving hosts. Similar to FIG. 5, there may be several receiving host-mapper combinations. Similar to FIG. 6, there may be several receiving host-mapper combinations, and one or more of these combinations may contain multiple receiving hosts. The TCP mappers at the sending side can then be set to one of the 2 modes previously described.

In yet another embodiment, the TCP mappers can also inter-operate with other TCP control devices within the network. The control devices and TCP mappers exchange data with each other and use these as inputs for operations. The control devices may interact with either send-side or receive-side TCP mappers in configurations where there is only one or the other; or both send-side and receive-side TCP mappers in configurations where there are both.

In another embodiment, referring to FIG. 2, in the event of a subnetwork failure within network 103, the TCP mapper 105 will continue to receive traffic from the sending host 101, and store traffic within buffers 109A to 109N while looking for an alternate path within network 103 to send traffic and the individual TCP congestion control programs within mapper 105 perform tuning for the alternate path.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

The invention claimed is:

1. A method for congestion control of traffic in a network that uses Transmission Control Protocol (TCP) and that includes at least one TCP congestion control program having one or more parameters and at least one TCP congestion control unit running one of said at least one TCP congestion control programs, said method comprising:
    intercepting an incoming TCP traffic flow;
    determining which one of the at least one TCP congestion control unit to map the intercepted incoming TCP traffic flow to; and
    mapping the intercepted incoming TCP traffic flow to a first of said at least one TCP congestion control programs based on at least one of
    (a) the type of application program from which the incoming TCP traffic flow originated,
    (b) the type of network for which the incoming TCP traffic flow is destined,
    (c) parameters related to network performance
    (d) network constraints,
    (e) source of the incoming TCP traffic flow, and
    (f) destination of the incoming TCP traffic flow; and
    tuning at least one of the one or more parameters of said at least one TCP congestion control program, wherein the tuning is based on network constraints comprising either prioritization of traffic, or traffic policing;
    auto-detecting the presence of the network constraints; and
    the intercepting, determining, mapping, tuning and auto-detecting performed by a TCP midstream proxy.

2. The method of claim 1, which includes buffering said incoming TCP traffic in a buffer associated with the first congestion control unit, to which said incoming TCP traffic flow is mapped.

3. The method of claim 1, wherein
said method comprises a plurality of TCP congestion control programs;
said incoming TCP traffic flow comprises Remote Desktop Protocol (RDP) traffic, at least one of the plurality of TCP congestion control programs controls congestion for RDP traffic, and the mapping comprises mapping the RDP traffic to said at least one of the plurality of TCP congestion control programs that controls congestion for RDP traffic.

4. The method of claim 1, wherein the method comprises a plurality of TCP congestion control programs, and
one of the plurality of TCP congestion control programs is the TCP CUBIC congestion control program.

5. A system for congestion control of traffic in a network that uses Transmission Control Protocol (TCP), said system comprising
a plurality of TCP congestion control programs having one or more parameters;
a plurality of TCP congestion control units, each congestion control unit running one of said plurality of TCP congestion control programs;
a TCP mapper acting as a midstream TCP proxy, wherein the TCP mapper intercepts an incoming TCP traffic flow,
determines which of the plurality of TCP congestion control units to map the intercepted incoming TCP traffic flow to, and
maps the intercepted incoming TCP traffic flow to a first one of said plurality of TCP congestion control units, said determining based on at least one of
(a) the type of application program from which the incoming TCP traffic flow originated,
(b) the type of network for which the incoming TCP traffic flow is destined,
(c) parameters related to network performance
(d) network constraints,
(e) source of the incoming TCP traffic flow, and
(f) destination of the incoming TCP traffic flow;
wherein said incoming TCP traffic flow originates from a TCP sending host; and
further wherein the TCP mapper dynamically switches the mapping from the first TCP congestion control unit to a second TCP congestion control unit.

6. The system of claim 5, wherein said TCP sending host includes a TCP engine;
the entirety of said TCP mapper is located within said TCP sending host; and
said TCP mapper is separated from said TCP engine.

7. The system of claim 6, wherein the determining is based on network constraints comprising at least one of
prioritization of traffic, and
traffic policing; and
the TCP mapper auto-detects the presence of the network constraints.

8. The system of claim 6, further comprising
measuring parameters related to network performance;
analyzing the measurements to determine if congestion is present, the analyzing further comprising
determining the persistence of the congestion, comprising
determining the evolution of loss and latency over time, and
determining the correlation between the loss and the latency; and
the determining of the plurality of TCP congestion control units to map the intercepted incoming TCP traffic flow to, is based on the analyzing.

9. The system of claim 5,
wherein the entirety of the TCP mapper is located on a device separate from the TCP sending host; and
wherein the device is located close to said sending host so as to reduce the round trip time seen by said sending host.

10. The system of claim 9, wherein the determining is based on network constraints comprising at least one of
prioritization of traffic, and
traffic policing; and
the TCP mapper auto-detects the presence of the network constraints.

11. The system of claim 9, further comprising measuring parameters related to network performance;
analyzing the measurements to determine if congestion is present, the analyzing further comprising
determining the persistence of the congestion, comprising
determining the evolution of loss and latency over time, and
determining the correlation between the loss and the latency; and
the determining of the plurality of TCP congestion control units to map the intercepted incoming TCP traffic flow is based on the analyzing.

12. The system of claim 5, wherein the network constraints comprise at least one of prioritization of traffic, and traffic policing; and
the TCP mapper auto-detects the presence of the network constraints.

13. The system of claim 5, further comprising
measuring parameters related to network performance;
analyzing the measurements to determine if congestion is present; and
wherein the determining is based on analysis of the measurements of parameters related to network performance.

14. The system of claim 13, wherein the analyzing further comprises determining the persistence of the congestion,
wherein said determining of persistence comprises
determining the evolution of loss and latency over time; and
determining the correlation between the loss and the latency.

15. The system of claim 5, wherein each of said plurality of TCP congestion control units has an associated buffer, and the TCP mapper stores the mapped incoming TCP traffic flow in the buffer associated with the first TCP congestion control unit to which the incoming TCP traffic flow is mapped.

16. The system of claim 15, wherein after the TCP mapper dynamically switches the mapping from the first TCP congestion control unit to the second TCP congestion control unit, the TCP mapper stores said mapped incoming TCP traffic flow in the buffer associated with the second TCP congestion control unit.

17. The system of claim 5, wherein at least one of the plurality of TCP congestion control programs is TCP CUBIC.

18. The system of claim 5, wherein the TCP mapper tunes at least one parameter of the TCP congestion control program run by the first TCP congestion control unit, and the tuning is based on parameters related to at least one of network performance and network constraints.

19. The system of claim 5, wherein the TCP mapper tunes at least one parameter of the TCP congestion control program run by the second TCP congestion control unit, and the tuning is based on parameters related to at least one of network performance and network constraints.

20. The system of claim 5, wherein the dynamic switching is based on network performance measurements.

* * * * *